United States Patent
Barone et al.

(10) Patent No.: US 9,897,194 B2
(45) Date of Patent: Feb. 20, 2018

(54) METHOD TO CONTROL AN ELECTRIC MOTOR OF A HYDRAULIC SYSTEM OF A TRANSMISSION IN A VEHICLE

(71) Applicant: Ferrari S.p.A., Modena (IT)

(72) Inventors: Alessandro Barone, Bologna (IT); Barbara Prina, Colonno (IT); Luca Poggio, Casalecchio di Reno (IT); Francesco Marcigliano, Maranello (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 15/255,519

(22) Filed: Sep. 2, 2016

(65) Prior Publication Data

US 2017/0089450 A1    Mar. 30, 2017

(30) Foreign Application Priority Data

Sep. 3, 2015  (IT) .................. 102015000048397

(51) Int. Cl.
  *F16H 57/04*   (2010.01)
  *F16H 61/00*   (2006.01)
  (Continued)

(52) U.S. Cl.
  CPC ..... *F16H 57/0435* (2013.01); *F15B 13/0444* (2013.01); *F15B 21/08* (2013.01); *F16H 57/0436* (2013.01); *F16H 57/0441* (2013.01); *F16H 61/0021* (2013.01); *F16H 61/0031* (2013.01); *B60K 6/36* (2013.01); *B60K 6/48* (2013.01); *B60K 6/547* (2013.01); *B60Y 2200/92* (2013.01); *B60Y 2306/03* (2013.01);
  (Continued)

(58) Field of Classification Search
  CPC ............. F16H 57/0435; F16H 57/0436; F16H 57/0441; F16H 61/0021; F16H 61/0031; F16H 3/006; F16H 3/093; F15B 13/0444; F15B 21/08; B60K 6/36; B60K 6/547; B60K 6/48; B60Y 2306/03; B60Y 2200/92; Y10S 903/909; Y10S 903/919
  See application file for complete search history.

(56) References Cited

U.S. PATENT DOCUMENTS 8,257,225 B2 *  9/2012  Marcigliano ......... B60W 10/02
                                                    477/78
8,292,782 B2 * 10/2012  Yamanaka ........ F16H 61/66272
                                                   477/102

(Continued)

FOREIGN PATENT DOCUMENTS

EP           2 428 706 A1    3/2012

*Primary Examiner* — Jacob S. Scott
*Assistant Examiner* — Tinh Dang
(74) *Attorney, Agent, or Firm* — Blank Rome LLP

(57) ABSTRACT

A method to control an electric motor of a hydraulic system of a transmission in a vehicle; the hydraulic system has a circulation pump, which allows a lubricant oil to circulate, and/or an actuation pump, which provides the hydraulic pressure needed to operate the transmission, a carrier shaft on which the pumps are mounted, and the electric motor designed to cause the rotation of the carrier shaft; the steps provided are: determining a requested torque to be applied by the electric motor to the carrier shaft; determining a requested rotation speed to be imparted by the electric motor to the carrier shaft; and controlling the electric motor so as to pursue the requested torque and the requested rotation speed.

12 Claims, 7 Drawing Sheets

(51) Int. Cl.
*F15B 13/044* (2006.01)
*F15B 21/08* (2006.01)
*F16H 3/00* (2006.01)
*F16H 3/093* (2006.01)
*B60K 6/36* (2007.10)
*B60K 6/48* (2007.10)
*B60K 6/547* (2007.10)

(52) U.S. Cl.
CPC .............. *F16H 3/006* (2013.01); *F16H 3/093* (2013.01); *Y10S 903/909* (2013.01); *Y10S 903/919* (2013.01)

(56) References Cited

U.S. PATENT DOCUMENTS

| | | | |
|---|---|---|---|
| 8,371,823 B2* | 2/2013 | Lee | F04B 49/06 417/22 |
| 8,690,733 B2* | 4/2014 | Waku | B60W 10/02 477/175 |
| 9,014,934 B2* | 4/2015 | Sah | F16H 61/0031 475/118 |
| 9,067,599 B2* | 6/2015 | Van Maanen | B60W 20/40 |
| 9,328,727 B2* | 5/2016 | Koehl | F04D 15/0088 |
| 9,611,931 B2* | 4/2017 | Naqvi | F16H 61/12 |
| 9,624,992 B2* | 4/2017 | Kasuya | B60K 6/48 |
| 2005/0072397 A1 | 4/2005 | Sluka et al. | |
| 2011/0135499 A1 | 6/2011 | Lee et al. | |
| 2013/0313048 A1 | 11/2013 | Naqvi et al. | |

* cited by examiner

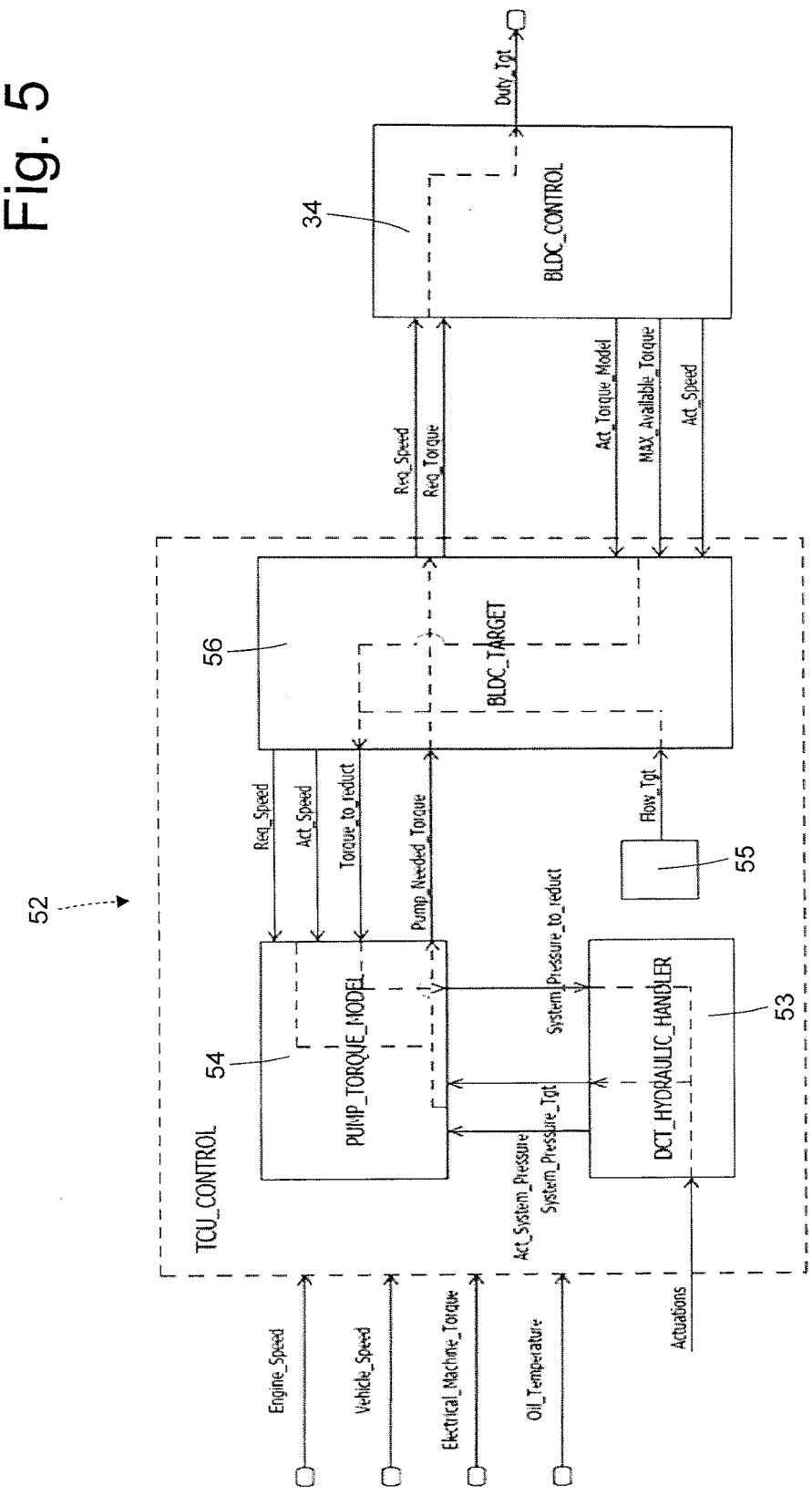

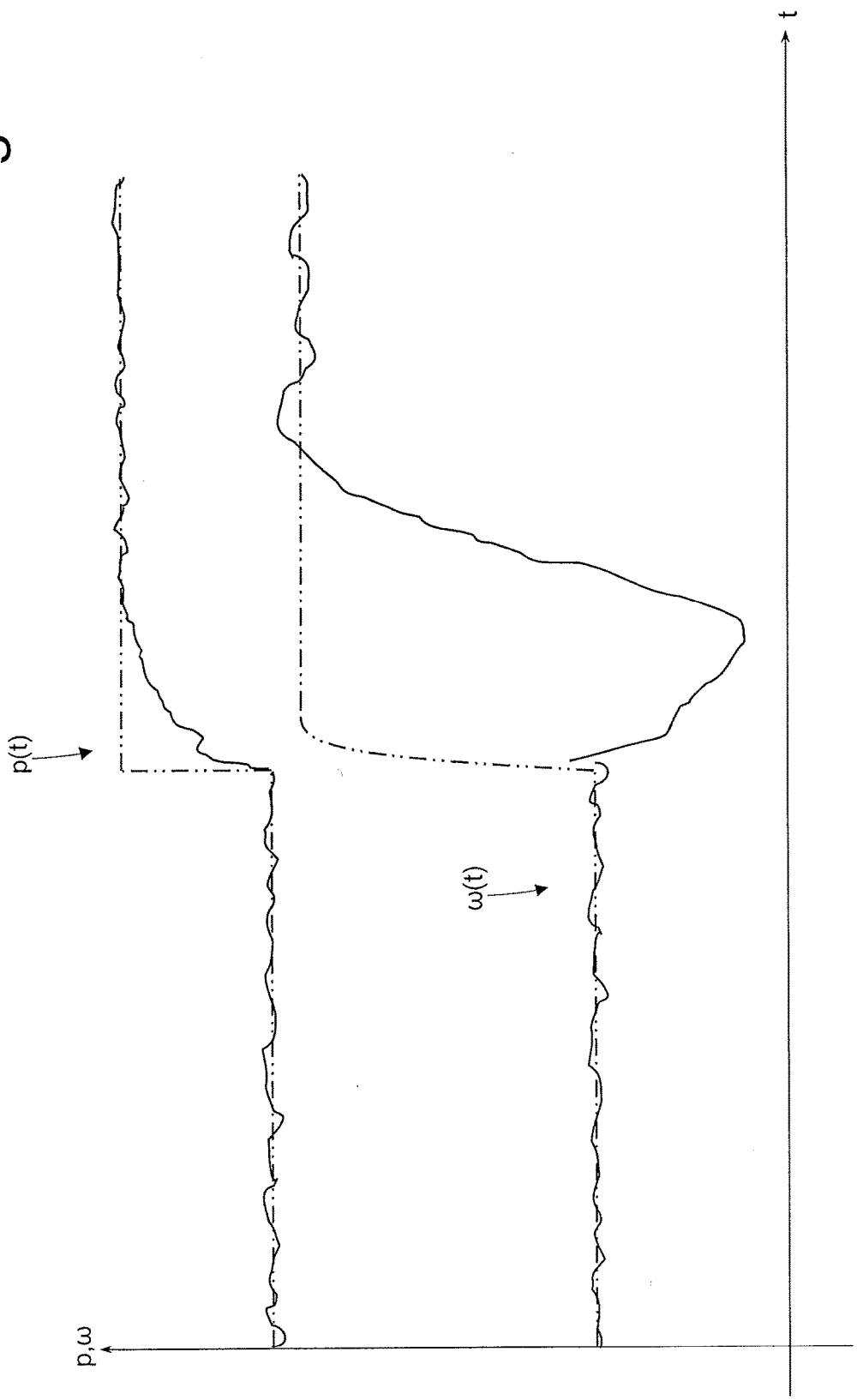

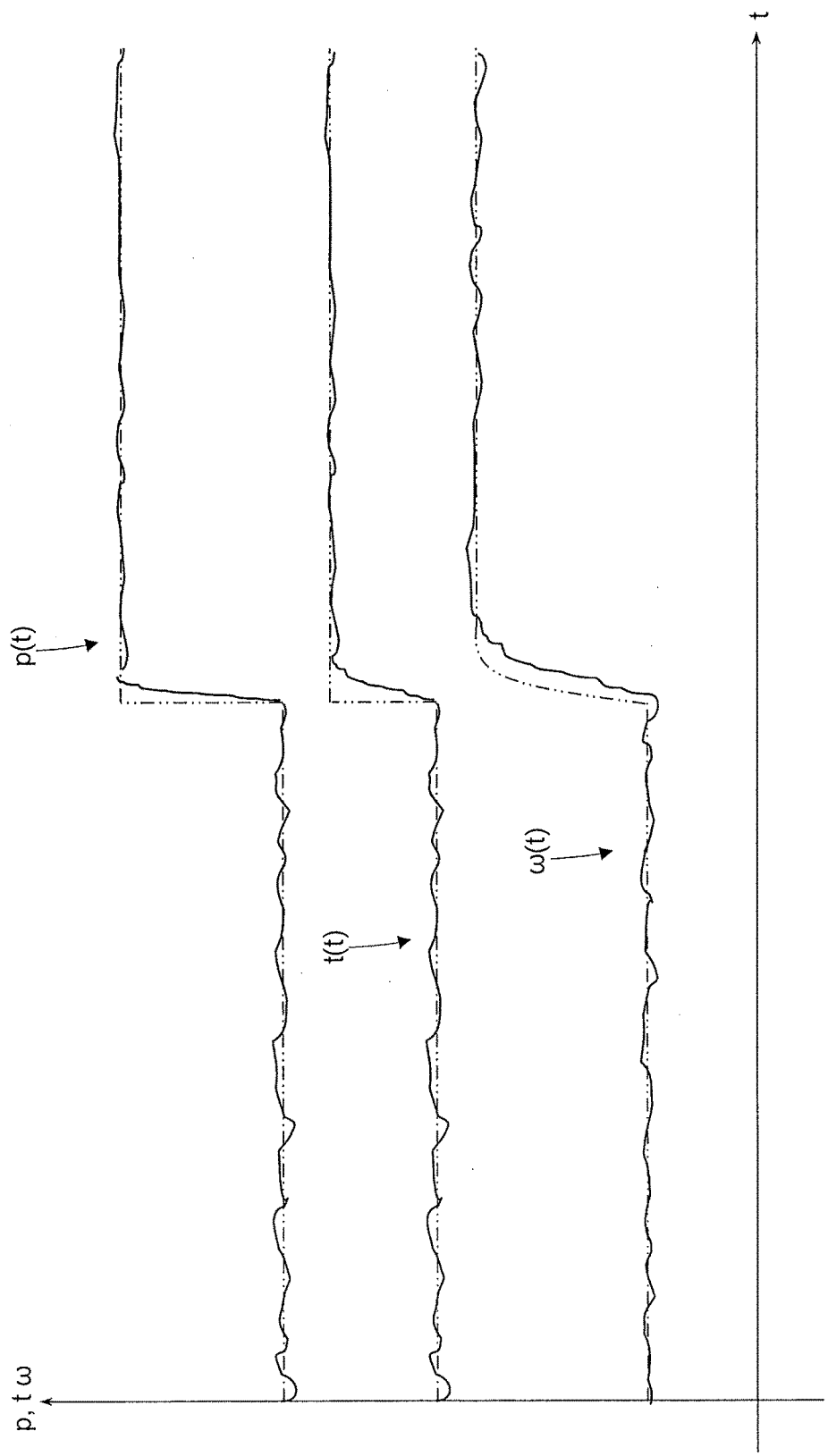

METHOD TO CONTROL AN ELECTRIC MOTOR OF A HYDRAULIC SYSTEM OF A TRANSMISSION IN A VEHICLE

TECHNICAL FIELD

The present invention relates to a method to control an electric motor of a hydraulic system of a transmission in a vehicle.

The present invention finds advantageous application in a hybrid vehicle, to which the following description will make explicit reference without implying any loss of generality.

PRIOR ART

A hybrid vehicle comprises an internal combustion heat engine, which transmits the drive torque to the drive wheels by means of a transmission provided with a gearbox coupled to a clutch, and at least one electric machine which is electrically connected to an electricity storage system and is mechanically connected to the drive wheels. Normally, the electric machine is mechanically connected to the drive wheels through the gearbox, so that it is possible to modify (by using at least part of the gears of the gearbox) the existing transmission ratio between the electric machine and the drive wheels to prevent the electric machine from over-speeding (namely rotating the electric machine at too high of a speed) and also to try to operate the electric machine at a favourable speed (namely at a speed which allows to obtain a high energy efficiency).

The transmission comprises a hydraulic system, which has the function to circulate, through the transmission itself (that is, through the gearbox and the clutch) a lubricant oil necessary for the lubrication and the cooling of all the components and an actuation oil necessary for the operation of the hydraulic actuators (used for engaging the gears and for the clutch control). Consequently, the hydraulic system generally comprises a circulation pump for the circulation of the lubricant oil and a pump for the actuation and the pressurization of the actuation oil.

In the transmissions currently in production market, the pumps of the hydraulic system are operated by an auxiliary carrier shaft which obtains its motion directly and permanently by the drive shaft (namely upstream of the clutch) so as to be always caused to rotate also when the clutch is open. However, this type of connection requires to always keep in rotation (with considerable frictions and inertias) the electric motor even in the case of purely electric traction to ensure the operation of the pumps of the hydraulic system.

In order to allow the operation of only the electric machine without having to also cause the movement of the heat engine, it has been proposed to make the carrier shaft of the pumps of the hydraulic system of the transmission, mechanically independent from the drive shaft and to rotate the carrier shaft only by means of a dedicated auxiliary electric motor; however, this solution is not very efficient from the energy point of view, because when the heat engine is running (that is, for most of the time during the use of the vehicle) it is more efficient to use part of the drive torque generated by the electric motor to directly operate auxiliary means rather than convert part of the drive torque generated by the heat engine into electric energy that is transformed back into mechanical torque by an auxiliary electric motor.

In order to increase energy efficiency when the heat engine is operating, it has been proposed to connect the carrier shaft of the pumps of the lubrication system of the transmission both to a dedicated auxiliary electric motor, and to the carrier shaft of the heat engine by means of corresponding freewheels (or idler wheels) which transmit or not transmit the motion (namely engage or not engage) depending on the direction of the speed difference. In this way, when the heat engine is running is the heat engine which directly cause the rotation of the carrier shaft of the pumps of the lubrication system of the transmission while the auxiliary electric motor remains still; on the contrary, when the heat engine is stopped it is the auxiliary electric motor which directly causes the rotation of the carrier shaft of the pumps of the lubrication system.

Generally, the auxiliary electric motor is a "sensorless BLDG" electric motor which allows generating a sufficiently high drive torque while, on a whole, having relatively reduced cost, weight and overall dimensions (considering both the electric machine as is, and the corresponding electronic power converter).

The auxiliary electric motor is controlled to pursue a requested torque (being determined based on the requested oil pressure used for the hydraulic actuation, namely of the oil pumped by the actuation pump) and a requested rotation speed (being determined both based on requested flow rate of the oil used for the lubrication, namely of the oil pumped by the circulation pump, and based on the needs of the actuation pump to deliver the requested pressure for the oil used for the hydraulic actuation). However, it was observed that the control of the auxiliary electric motor is effective in a steady state (namely when the requested oil pressure and the requested oil flow rate are stable or slowly varying), whereas it loses greatly in effectiveness in a dynamic state (namely when the requested oil pressure and/or the requested oil flow rate rapidly vary, typically in preparation of a gear shift); in particular, it is critical to control the rotation speed which, in unfavourable situations, reaches significant deviations between the actual rotation speed and the requested rotation speed until reaching high sub-speed which can determine the switching off of the auxiliary electric motor (which, by being "sensorless" cannot regain synchronicity once it is lost).

The patent application US2013313048A1 describes a method to control an electric motor of a hydraulic system of a transmission in a vehicle; the hydraulic system comprises a circulation pump which circulates a lubricant oil of the transmission, a carrier shaft on which the circulation pump and the electric motor are mounted designed to cause the rotation of the carrier shaft. The control method comprises the steps of: determining a requested torque that the electric motor must apply to the carrier shaft; determining a requested rotation speed that the electric motor must impart to the carrier shaft; and controlling the electric motor so as to pursue the requested torque and the requested rotation speed. In the patent application US2013313048A1, the requested torque is determined based on the requested rotation speed; in turn the requested rotation speed is determined based on the requested flow characteristics of the oil.

Also the patent applications EP2428706A1 and US2011135499A1 describe corresponding methods to control an electric motor of a hydraulic system of a transmission in a vehicle.

DESCRIPTION OF THE INVENTION

The object of the present invention is to provide a method to control an electric motor of a hydraulic system of a transmission in a vehicle, which control method allows to improve the operation of the electric motor and at the same time is easy and inexpensive to produce.

According to the present invention a method to control an electric motor of a hydraulic system of a transmission in a vehicle, as claimed by the appended claims, is provided.

BRIEF DESCRIPTION OF THE DRAWINGS

The present invention will now be described with reference to the accompanying drawings, which illustrate a non-limiting embodiment, wherein:

FIG. 5 is a block diagram which illustrates the control logic used to provide the target torque and target rotation speed to the auxiliary electric motor of FIG. 3;

FIG. 6 is a graph illustrating the evolution in time of the targets and of the actual values of the oil pressure and of the rotation speed of the auxiliary electric motor of FIG. 3 by applying a conventional control method; and FIG. 7 is a graph illustrating the evolution in time of the targets and of the actual values of the oil pressure, of the torque of the auxiliary electric motor of FIG. 3, and of the rotation speed of the auxiliary electric motor of FIG. 3 by applying the control method of the present invention.

PREFERRED EMBODIMENTS OF THE INVENTION

Figure 1:
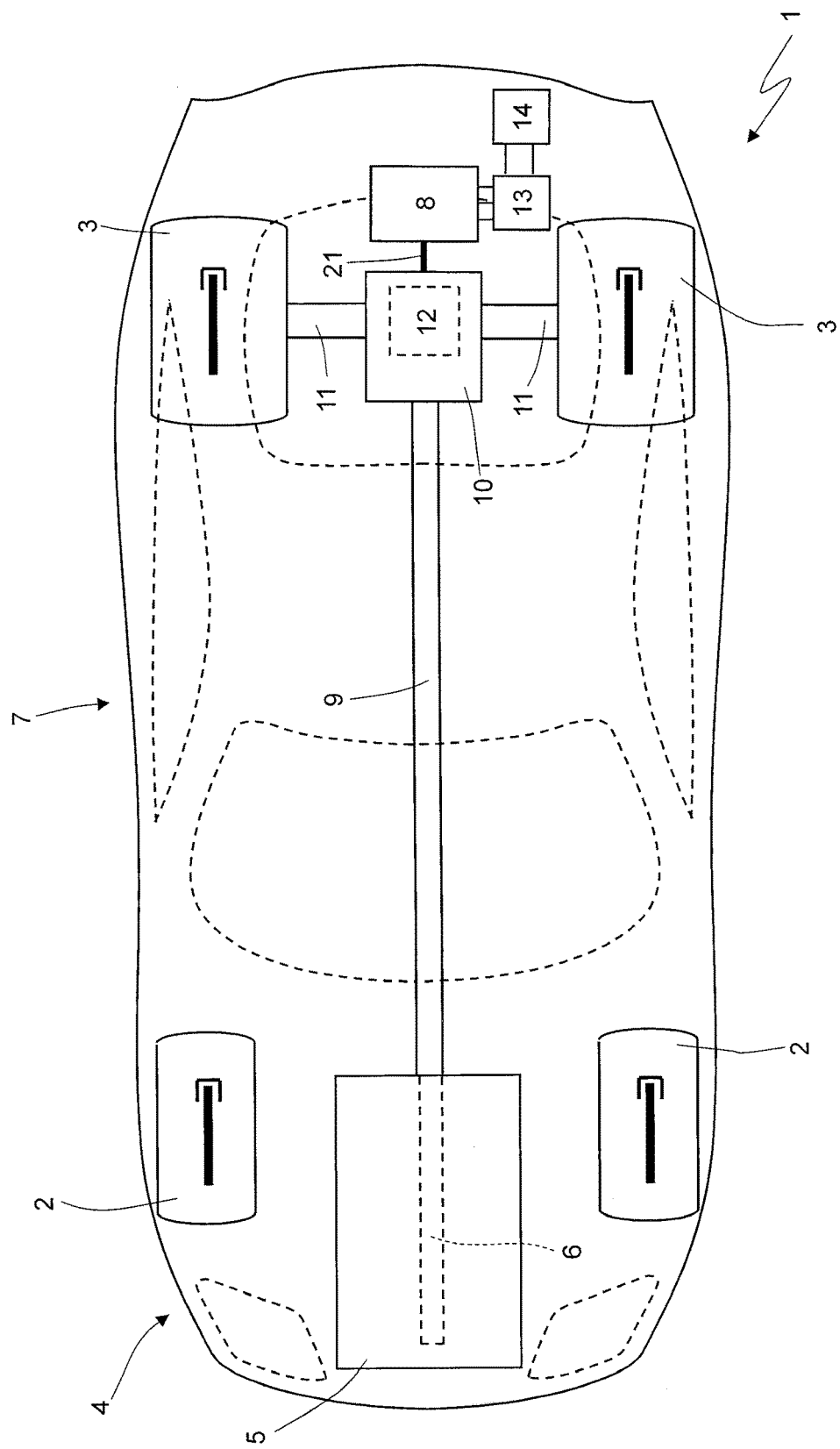
FIG. 1 is a schematic view of a road vehicle with hybrid propulsion.

In FIG. 1, number 1 denoted as a whole a road vehicle with hybrid propulsion having two front wheels 2 and two rear drive wheels 3, which receive the drive torque from a 4 hybrid powertrain system.

The hybrid powertrain system 4 comprises an internal combustion heat engine 5, which is arranged in a front position and is provided with a drive shaft 6, a transmission 7, which transmits the drive torque generated by the heat engine 5 to the rear drive wheels 3, and a reversible electric machine 8 (that is, which can function both as an electric motor by absorbing electric energy and generating a mechanical drive torque, and as electric generator by absorbing mechanical energy and generating electric energy) which is mechanically connected to the transmission 7.

The transmission 7 comprises a transmission shaft 9 which on one side is angularly integral with drive shaft 6 and the other side is mechanically connected with a dual clutch gearbox 10, which is arranged in the rear position and transmits the motion to the rear drive wheels 3 by means of two axle shafts 11 that receive the motion from a differential 12. The reversible electric machine 8 is mechanically connected to the dual clutch gearbox 10 as will be described later and is controlled by an electronic power converter 13 connected to an accumulation system 14 which is designed to store electric energy and is provided with chemical and/or super-capacitor batteries.

Figure 2:
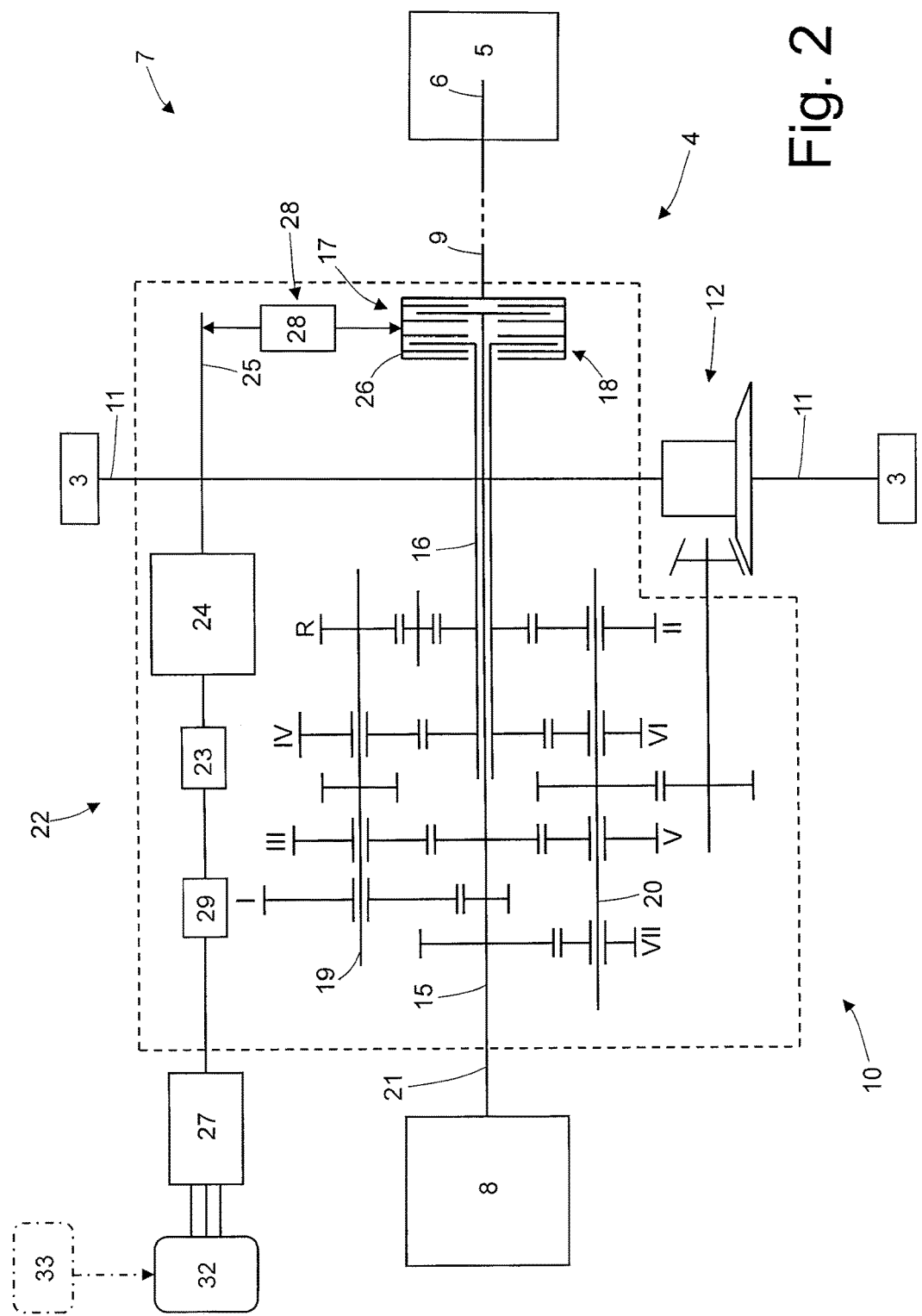
FIG. 2 is a schematic view of a transmission of the road vehicle of FIG. 1 provided with a hydraulic system.

As illustrated in FIG. 2, the dual clutch gearbox 10 comprises two primary shafts 15 and 16 coaxial to each other, independent and inserted one inside the other and two clutches 17 and 18 coaxial and arranged in series, each of which is designed to connect a primary shaft 15 or 16 to the transmission shaft 9 (therefore to the drive shaft 6 of the internal combustion heat engine 5). Moreover, the dual clutch gearbox 10 comprises two secondary shafts 19 and 20, both of which are angularly integral with the entrance of the differential 11 which transmits the motion to the rear drive wheels 3. The electric machine 8 has a shaft 21, which is permanently connected to the primary shaft 15 so as to always rotate integrally with the primary shaft 15 itself.

The transmission 7 comprises a hydraulic system 22 (only partly and schematically illustrated in FIG. 2), which has the function to circulate a lubricant oil needed for the lubrication of all the components and an actuation oil necessary for the operation of the hydraulic actuators (used for the engagement of the gears in the gearbox 10 and for the control of the clutches 17 and 18) through the transmission 7 itself (that is, through the gearbox 10 and the clutches 17 and 18). The hydraulic system 22 of the transmission 7 comprises a circulation pump 23, which has the function to circulate the lubricant oil through the gearing of the gearbox 10 and the discs of the clutches 17 and so as to ensure an adequate lubrication and an adequate cooling. Furthermore, the hydraulic system 22 of the transmission 7 comprises an actuation pump 24 providing the hydraulic pressure needed to operate the hydraulic actuators for engaging the gears (that is, the actuators of the synchronizers of the gearbox 10) and the actuators for controlling the clutches 17 and 18.

The two pumps 23 and 24 of gearbox 10 are operated by a through auxiliary carrier shaft 25 (that is, which passes through each pump 23 and 24) which on one side is caused to rotate by a front drum 26 of the clutches 17 and 18 which is integral with the drive shaft 6 (with the interposition of the transmission shaft 9) and from the opposite side is caused to rotate by an auxiliary electric motor 27 (for example a "sensorless BLDC" electric motor). Between the carrier shaft 25 and the drive shaft 6 (namely between the carrier shaft 25 and the front drum 26 of the clutches 17 and 18) a freewheel 28 (or idle wheel 28) is interposed, which transmits or does not transmit the motion (namely engages or does not engage) depending on the direction of the speed difference. Similarly, also between the carrier shaft 25 and the auxiliary electric motor 27 a freewheel 29 (or idle wheel 29) is interposed, which transmits or does not transmit the motion (namely engages or does not engage) depending on the direction of the speed difference.

When the heat engine 5 is turned on (namely when the drive shaft of the heat engine 5 is rotating), the auxiliary electric motor 27 is kept turned off: the rotation speed imparted to the carrier shaft 25 by the drive shaft 6 of the heat engine 5 exceeds the rotation speed imparted to the carrier shaft 25 by the auxiliary electric motor 27 (which is stopped), and then the freewheel 28 is engaged and transmits the motion towards the pumps 23 and 24 while the freewheel 29 is not engaged and "separates" the auxiliary electric motor 27 from the carrier shaft 25; in other words, the carrier shaft 25 is rotated by the drive shaft 6 of the heat engine 5 while the carrier shaft 25 is isolated from the auxiliary electric motor 27.

When the heat engine 5 is turned off (namely when the drive shaft 6 of the heat engine 5 is stopped), the auxiliary electric motor 27 is activated: the rotation speed imparted to the carrier shaft 25 by the drive shaft 6 of the heat engine 5 (which is stopped) is lower than the rotation speed imparted to the carrier shaft 25 by the auxiliary electric motor 27 and then the freewheel 29 is engaged, and therefore transmits the motion to the pumps 23 and 24 while the freewheel 28 is not engaged and separates the drive shaft 6 of the heat engine 5 from the carrier shaft 25; in other words; the carrier shaft 25 is rotated by the auxiliary electric motor 27 while the carrier shaft 25 is insulated from the drive shaft 6 of the heat engine 5.

Figure 3:
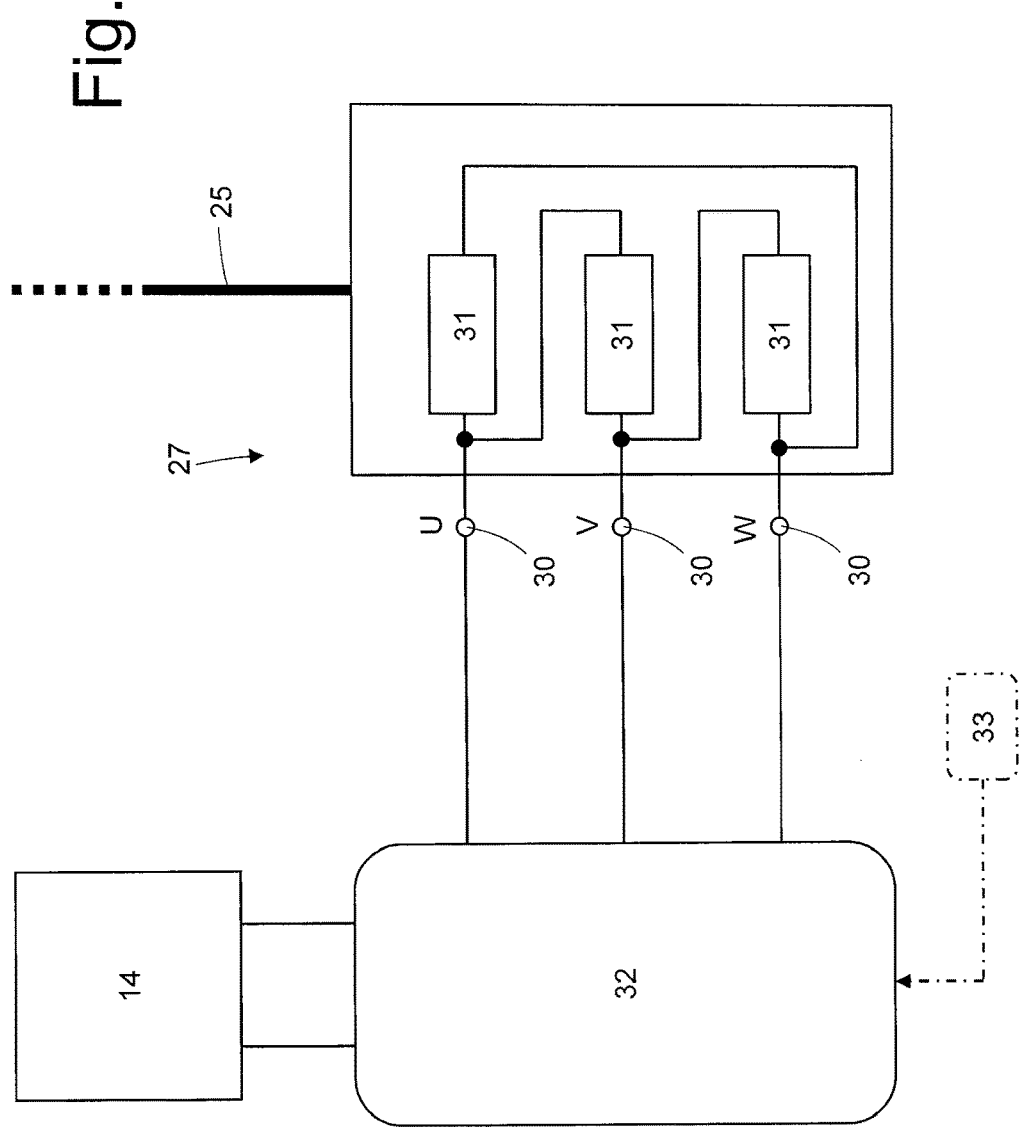
FIG. 3 is a schematic view of an auxiliary electric motor of the hydraulic system of FIG. 2, which auxiliary electric motor is controlled according to the control method of the present invention.

As illustrated in FIG. 3, the auxiliary electric motor 27 is a three-phase alternating current electric motor having power supply terminals 30 through which the electric energy is transmitted. In the schematic representation of FIG. 3, inside of the auxiliary electric motor 27 three equivalent impedances 31 connected together in a triangle (but could also be connected in a star shape) are illustrated; of course in reality the internal electric circuit of the auxiliary electric motor 27 is much more complex and articulated than what schematically shown in FIG. 3. The auxiliary electric motor 27 is controlled by a power electronic converter 32 connected to the storage system 14; the power electronic converter 32 converts the DC current supplied by the storage system 14 into three-phase alternating current at variable frequency to control the auxiliary electric motor 27.

A control unit 33 is provided, which supervises the operation of the hydraulic system 22, and then, among other things, controls the power electronic converter 32 to operate, when necessary, the auxiliary electric motor 27 (namely to turn on the auxiliary electric motor 27 in case of purely electric traction with the heat engine 5 turned off).

Figure 4:
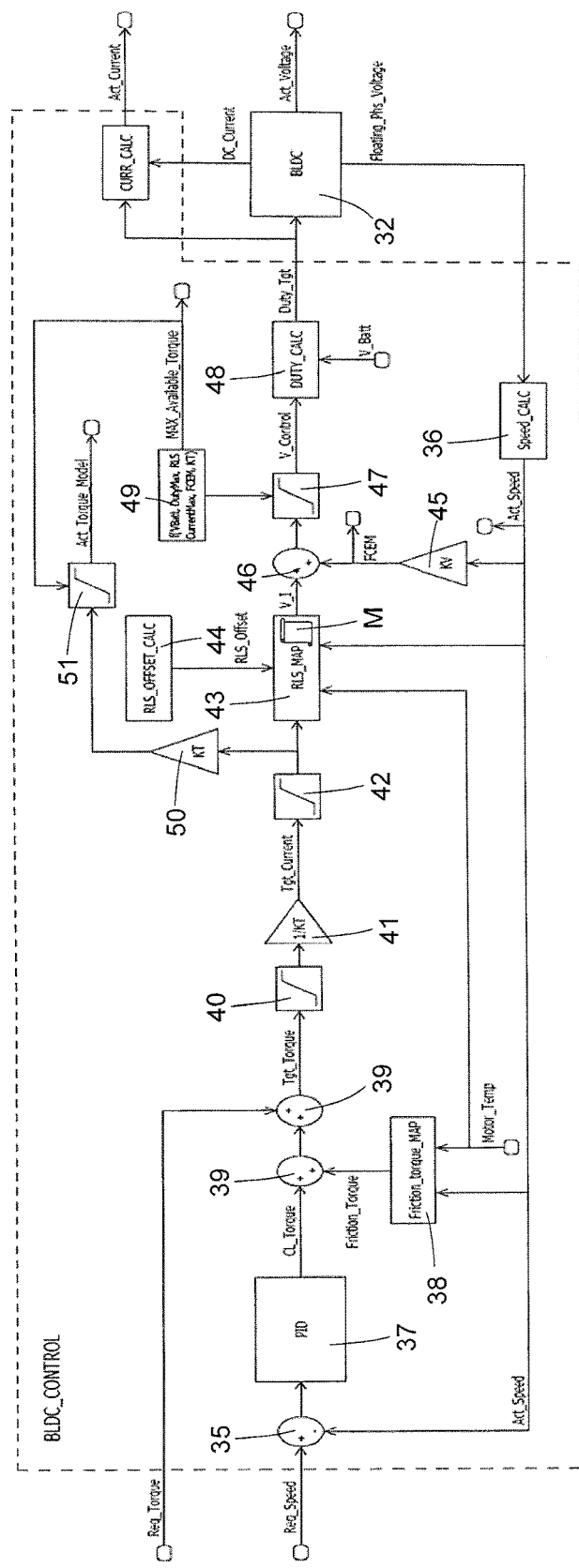
FIG. 4 is a block diagram which illustrates a control logic used for controlling the auxiliary electric motor of FIG. 3.

As illustrated in FIG. 4, inside the control unit 33 a control module 34 is provided, which supervises the operation of the auxiliary electric motor 27 by directly controlling the power electronic converter 32. The control module 34 receives as input the requested torque Req_Torque that must be applied by the auxiliary electric motor 27 to the carrier shaft 25 (being determined, as better described hereinafter, mainly based on the requested oil pressure used for the hydraulic actuation, namely the oil pumped by the actuation pump 24) and the requested rotation speed Req_Speed that the auxiliary electric motor 27 must impart to the carrier shaft 25 (being determined, as better described hereinafter, both based on the requested flow rate of the oil used for the lubrication, namely of the oil pumped by the circulation pump 23, and based on the needs of the actuation pump 24 to deliver the requested pressure of the oil used for the hydraulic actuation). In a subtractor block 35 the actual rotation speed Act_Speed (estimated by an estimator block 36 based on the voltage phase Floating_Phs_Voltage of the electric motor 27) is subtracted from the requested rotation speed Req_Speed to calculate a speed error which is provided to a PID control block 37 which determines the sustenance torque CL_Torque needed to obtain the requested rotation speed Req_Speed. An estimator block 38 determines by means of a map (being experimentally determined and stored in a non-volatile memory of the control unit 33) a friction torque Friction_Torque which is equal to the mechanical friction inside the auxiliary electric motor 27; the map provides the friction torque Friction_Torque based on the actual rotation speed Act_Speed and on the internal temperature Motor_Temp of the auxiliary electric motor 27 (measured by a temperature sensor or estimated in the absence of the temperature sensor). Two adding blocks 39 add, one to the other, the requested torque Req_Torque, the sustenance torque CL_Torque, and the friction torque Friction_Torque to determine the target torque Tgt_Torque. The target torque Tgt_Torque is filtered through a limiting block 40 which limits the maximum value of the target torque Tgt_Torque (so as not to exceed the mechanical limits of the auxiliary electric motor 27), and then is supplied to a calculation block 41, which calculates the target current Tgt_Current by dividing the target torque Tgt_Torque by the torque constant KT (which is a fixed parameter that never changes, is determined experimentally and is stored in a non-volatile memory of the control unit 33).

The target current Tgt_Current is filtered through a limiting block 42 which limits the maximum value of the target current Tgt_Current (so as not to exceed the limits of the auxiliary electric motor 27), and then is supplied to a calculation block 43 which calculates the voltage drop V_I inside the auxiliary electric motor 27 by multiplying the target current Tgt_Current by the equivalent impedance RLS of the auxiliary electric motor 27; the equivalent impedance RLS of the auxiliary electric motor 27 is provided by a map M (being experimentally determined and stored in a non-volatile memory of the control unit 33) based on the internal temperature of the auxiliary electric motor 27 and on the actual rotation speed Act_Speed. A compensator block 44 (described in detail hereinafter) is provided, which provides an offset parameter RLS_offset that is added to the equivalent impedance RLS of the auxiliary electric motor 27 provided by the map M and serves to compensate for the effect of the constructive dispersion (namely the construction tolerance) of the different components; the offset parameter RLS_offset is algebraically added to the equivalent impedance RLS of the auxiliary electric motor 27 provided by the map M, namely the offset parameter RLS_offset can be negative or positive and therefore can decrease or increase the value of the equivalent impedance RLS.

A calculation block 45 determines the counter-electromotive force EMF of the auxiliary electric motor 27 by multiplying the actual rotation speed Act_Speed by the speed constant KV (which is a fixed parameter that never changes, is determined experimentally and is stored in a non-volatile memory of the control unit 33). An adding block 46 determines the voltage control V_Control to be applied to the power supply terminals 30 of the electric motor 27 by adding the voltage drop V_I inside the auxiliary electric motor 27 to the counter-electromotive force EMF of the auxiliary electric motor 27. Downstream of the adding block 46 a limiting block 47 is arranged, which limits the maximum value of the voltage control V_Control (so as not to exceed the limits of the auxiliary electric motor 27). The voltage control V_Control is supplied to a calculation block 48 which determines in a known manner the target duty-cycle Duty_Tgt, which is used to control the power electronic converter 32 based on the battery voltage V_Batt (namely the calculation block 48 determines when to partialise in time the battery voltage V_Batt to obtain, on average, the application of the voltage control V_Control).

The control module 34 also comprises a further calculation block 49, which determines the maximum available torque MAX_Available_Torque (namely the maximum torque that the auxiliary electric motor 27 can deliver in the current conditions) by using a map (being experimentally determined and stored in a non-volatile memory of the control unit 33); in particular, the map provides the maximum available torque MAX_Available_Torque based on the battery voltage V_Batt, on the maximum duty-cycle Duty-Max with which the power electronic converter 32 can be controlled, the equivalent impedance RLS, the maximum current CurrentMax bearable by the windings of the auxiliary electric motor 27, the counter-electromotive force FCEM, and the torque constant KT. In addition, the control module 34 also comprises a further calculation block 50 which calculates the actual model torque Act_Torque_Model by multiplying the target current Tgt_Current limited by the limiting block 42 by the torque constant KT; subsequently, the actual model torque Act_Torque_Model is filtered through a limiting block 50, which limits the maximum value of the actual model torque Act_Torque_Model based on the maximum available torque MAX_Available_Torque (namely the actual model torque Act_Torque_Model can never be greater than the maximum available torque MAX_Available_Torque).

As illustrated in FIG. 5, inside the control unit 33 a control module 52 is provided, which is arranged upstream of the control module 34 and calculates the targets for the auxiliary electric motor 27 (namely the requested torque Req_Torque and the requested rotation speed Req_Speed) to be supplied to the control module 34 (preferably the control module 52 communicates with the control module 34 by using a dedicated "CAN" network).

From one of the engine control unit (usually through the "CAN" network of the road vehicle 1), the control module 52 receives, as input, the rotation speed Engine_Speed of the heat engine 5, the forward speed Vehicle_Speed of the road vehicle 1 and the torque Electric_Machine_Torque (supplied or absorbed) of the electric machine 8. From the hydraulic system 22, the control module 52 receives as input the oil temperature Oil_Temperature of the hydraulic system 22 (generally measured by a suitable temperature sensor). From a transmission control unit (which dialogues with the engine control unit and supervises the variation of the transmission ratio), the control module 52 receives as input an actuation communication Actuators relating to the activation of the hydraulic actuators to perform a gear shift. From the control module 34, the control module 52 receives as input the actual rotation speed Act_Speed of the auxiliary electric motor 27, from the actual torque model Act_Torque_Model and the maximum available torque MAX_Available_Torque.

The control module 52 comprises a calculation block 53, which measures (with a dedicated pressure sensor) or estimates the actual oil pressure Act_System_Pressure in the delivery side of the actuation pump 24 and determines the target oil pressure System_Pressure_Tgt in the delivery side of the actuation pump based on the needs for actuation through the hydraulic actuators, namely based on the operations to be carried out in the near future by the different hydraulic actuators (for example, engaging/disengaging of the parklock device, the engagement of the gears, the opening and closing of the clutches). Consequently, the target oil pressure System_Pressure_Tgt in the delivery side of the actuation pump 24 is very dynamic, namely can vary greatly and extremely quickly based on the request (will, need) of activation of the hydraulic actuators. For example, in case of travelling at constant speed the target oil pressure System_Pressure_Tgt in the delivery side of the actuation pump 24 is generally low, but can rise quickly to high values as soon as performing a gear shift is requested.

The control module 52 comprises a calculation block 54, which determines the torque Pump_Needed_Torque needed by the pump, namely the drive torque which must be applied by the auxiliary electric motor 27 to the carrier shaft 25 so as to allow the actuation pump 24 to provide the oil with a suitable pressure for the optimal operation of the hydraulic actuators. In particular, the torque Pump_Needed_Torque needed by the pump is determined based on the rotation speed Engine_Speed of the heat engine 5, on the oil temperature Oil_Temperature, on the actual oil pressure Act_System_Pressure, and on the target oil pressure System_Pressure_Tgt; the set of these values allows to locate the current operating point of the hydraulic system 22 and especially the future evolution of the working point of the hydraulic system 22 to precisely estimate the current load and the future load of the actuation pump 24. Preferably, the calculation block 54 determines the torque Pump_Needed_Torque needed by the pump using a mathematical model of the absorption of the actuation pump 24.

Preferably, the torque Pump_Needed_Torque needed by the pump is also determined based on the actual rotation speed Act_Speed and on the requested rotation Req_Speed that provide an indication of the current and future state of motion of the auxiliary electric motor 27 so as to make the requests compatible with the capacity of response of the auxiliary electric motor 27 (for example, if the auxiliary electric motor 27 is currently stopped, it is not realistic that it can arrive, in very short time, to deliver the nominal power, namely relevant torque at very high rotation speed).

The calculation block 54 receives (as better described hereinafter) a torque reduction signal Torque_to_reduct which indicates a potential mechanical overload of the auxiliary electric motor 27, varies in a certain range (for example from 0 to 100), and indicates the need to reduce the resistant mechanical torque burden on the auxiliary electric motor 27 to avoid to excessively overload the auxiliary electric motor 27 (namely to charge the auxiliary electric motor 27 beyond its limits resulting in the consequential shutdown of the auxiliary electric motor 27 that fails to "satisfy" all requests).

The calculation block 54 also determines a pressure reduction signal System_Pressure_to_reduct that varies in a certain range (for example from 0 to 100), is supplied to the calculation block 53 and indicates the need to reduce the oil pressure for the purpose of hydraulic actuations to avoid to excessively overload the auxiliary electric motor 27; in this way, the control of the hydraulics of the hydraulic system 22 is alerted to slow down and/or to defer (delay) in time the hydraulic actuations in order to not excessively overload the auxiliary electric motor 27. Obviously, the pressure reduction signal System_Pressure_to_reduct is closely related to the torque reduction signal Torque_to_reduct, that is, the pressure reduction signal System_Pressure_to_reduct is determined based on the torque reduction signal Torque_to_reduct and is generally proportional to the torque reduction signal Torque_to_reduct itself. Based on the pressure reduction signal System_Pressure_to_reduct it is necessary to slow down and/or to defer (delay) in time the hydraulic actuations, namely it is necessary to slow down or defer in time the gear shift operations (for example, a gear shift, instead of taking place immediately and last a few tenths of a second, is delayed and lasts a second or more); the slowed/delayed performing of gear shift operations is acceptable, since it takes place only in case of purely electric drive, which, by definition, is not a high performance gear.

The control module 52 comprises a calculation block 55, which by means of a map (being experimentally determined and stored in a non-volatile memory of the control unit 33) determines the target flow rate Flow_Tgt, namely the oil flow rate that must be supplied by the circulation pump 23 for an adequate lubrication of the transmission 7. in particular, the target flow rate Flow_Tgt is determined based on the oil temperature Oil_Temperature of the hydraulic system 22, on the rotation speed Engine_Speed of the heat engine 5, on the forward speed Vehicle_Speed of the road vehicle 1 and on the torque Electric_Machine_Torque (supplied or absorbed) of the electric machine 8.

Preferably, the target flow rate Flow_Tgt is also determined based on the actual rotation speed Act_Speed and on the requested rotation Req_Speed that provide an indication of the current and future state of motion of the auxiliary electric motor 27 so as to make the requests compatible with the response capabilities of the auxiliary electric motor 27

(for example, if the auxiliary electric motor 27 is currently stopped, it is not realistic that it can arrive, in a very short time, to deliver the nominal power, namely relevant torque at very high rotation speed).

The control module 52 comprises a coordination block 56, which, by means of a map (being experimentally determined and stored in a non-volatile memory of the control unit 33) or by means of a model of the auxiliary electric motor 27 determines the requested rotation speed Req_Speed, the requested torque Req_Torque and the torque reduction signal Torque_to_reduct. In particular, the requested rotation speed Req_Speed, the requested torque Req_Torque and the torque reduction signal Torque_to_reduct are determined based on the torque Pump_Needed_Torque needed by the pump, the target flow rate Flow_Tgt, the actual model torque Act_Torque_Model, the maximum available torque MAX_Available_Torque, and the actual rotation speed Act_Speed. Preferably, the requested rotation speed Req_Speed is substantially determined based on the target flow rate Flow_Tgt, on the actual rotation speed Act_Speed, and on the needs of the actuation pump 24 to deliver the requested pressure of the oil used for the hydraulic actuation; instead, the requested torque Req_Torque is determined substantially based on the torque Pump_Needed_Torque needed by the pump, on the actual model torque Act_Torque_Model and on the maximum available torque MAX_Available_Torque (which is an upper limit that cannot be exceeded by the requested torque Req_Torque). Preferably, the torque reduction signal Torque_to_reduct intervenes when the requested torque Req_Torque which would result based on the torque Pump_Needed_Torque needed by the pump is greater than the maximum available torque MAX_ Available_ Torque (of course, the torque reduction signal Torque_to_reduct is greater as is greater the exceedance of the maximum torque available MAX_Available_Torque).

In essence, the coordination block 56 represents a coordinator of the torque request (torque Pump_Needed_Torque needed by the pump) and of the rotation speed request (target flow rate Flow_Tgt) which, taking into account the functional characteristics and the current operating point of the auxiliary electric motor 27 tries to reconcile the torque request and the rotation speed request, namely tries to find the best possible compromise between the torque request and the rotation speed request (favouring, as mentioned earlier, the torque request).

Generally, the requested rotation speed Req_Speed is initially strongly linked to the target flow rate Flow_Tgt and can be modified based on needs of the actuation pump 24 to deliver the requested oil pressure used for the hydraulic actuation; namely there is a very strong link and of direct proportionality between the requested rotation speed Req_Speed and the target flow rate Flow_Tgt which is, if necessary, corrected based on the needs of the actuation pump 24 to deliver the requested oil pressure used for the hydraulic actuation. Instead, the requested torque Req_Torque is strongly linked to the torque Pump_Needed_Torque needed by the pump; namely there is a very strong link and of direct proportionality between the requested torque Req_Torque and the torque Pump_Needed_Torque needed by the pump. In other words, the requested rotation speed Req_Speed is mainly determined based on the target flow rate Flow_Tgt (with a contribution of the requested torque Req_Torque that can also be relevant) and the requested torque Req_Torque is mainly determined based on the target torque Tgt_Torque (with a modest contribution of the target flow rate Flow_Tgt).

In other words, in establishing the requested rotation speed Req_Speed and the requested torque Req_Torque the achievement of the requested pressure for the oil used for the hydraulic actuation is privileged; consequently, both the requested rotation speed Req_Speed, and the requested torque Req_Torque are established to enable the actuation pump 24 to deliver the requested pressure for the oil used for the hydraulic actuation. In this regard it is important to note that the actuation pump is not able to deliver a certain hydraulic pressure at a normal rotation speed, but is constrained to deliver a certain hydraulic pressure at a corresponding rotation speed range; therefore, the requested rotation speed Req_Speed is corrected, if necessary, to allow the actuation pump 24 to deliver the requested pressure for the oil used for the hydraulic actuation. From another point of view, the requested pressure of the oil used for the hydraulic actuation entails both a constraint on the drive torque that must be applied to the shaft of the actuation pump 24, and a constraint to the rotation speed of the shaft of the actuation pump 24 that must meet with the lubrication requirements (which are however less important compared to the needs of the hydraulic actuation).

Obviously, the coordination block 56 determines together (that is, in a coordinated manner) the requested torque Req_Torque and the requested rotation speed Req_Speed to ensure that the two targets (requested torque Req_Torque and requested rotation speed Req_Speed) are compatible, or may be joined together by the auxiliary electric motor 27; in other words, the auxiliary electric motor 27 is not capable of delivering just any torque at any rotation speed, but it is necessary that the two targets (requested torque Req_Torque and requested rotation speed Req_Speed) together determine a working point which belongs to a reachable operating point of the auxiliary electric motor 27.

It is important to note that coordination block 56 favours the needs concerning the fulfilment of the torque Pump_Needed_Torque needed by the pump with respect to the needs concerning the fulfilment of the target flow rate Flow_Tgt; in other words, to avoid overloading the auxiliary electric motor 27 the coordination block 56 tries to always have a requested torque Req_Torque, which allows to obtain the torque Pump_Needed_Torque needed by the pump and if necessary sacrifice (namely underestimation or overestimation) the requested rotation speed Req_Speed compared to what is necessary to achieve the target flow rate Flow_Tgt. In other words, the main purpose of the coordination block 56 is to precisely pursue the torque Pump_Needed_Torque needed by the pump, whereas pursuing the target flow rate Flow_Tgt is secondary (less important, expendable although obviously not to be ignored entirely) compared to the pursuing of the torque Pump_Needed_Torque needed by the pump. In the case of incompatibility between the pursuing of the torque Pump_Needed_Torque needed by the pump and the pursuing of the target flow rate Flow_Tgt (for example when the target flow rate Flow_Tgt requires a rotation speed in an area where the torque generated by the auxiliary electric motor 27 is decreasing) is preferable to give priority to the hydraulic actuation which normally has a duration of less than a second (normally a gear shift requires a total of not more than some tenths of a second) because for very short time intervals it is not a problem to sacrifice lubrication; moreover, by choosing the opposite option, namely by sacrificing the hydraulic actuation, it is very likely to lose the synchronicity of the auxiliary electric motor 27 (which, by delivering insufficient torque to fulfil the mechanical loads it slows down thus offsetting the synchronicity) which involves the stopping of the auxiliary electric motor 27 itself (of course the auxiliary electric motor 27 can be restarted immediately, but for a few seconds both the hydraulic actuation and the lubrication will be completely cut off).

In summary, the load of the auxiliary electric motor 27 is highly variable (particularly with regard to the hydraulic actuators that are used only in case of shifting gear). In addition, the auxiliary electric motor 27 is relatively "fragile", as being "sensorless" it cannot recover synchronicity once lost and therefore may shutdown in case of high sub-speeds. However, the load of the auxiliary electric motor 27 even if strongly variable is expected, as dependent on the actuation of the hydraulic actuators and on the lubrication needs which are controlled by the control unit 33 (namely the control unit 33 decides when and how to perform actuations of the hydraulic actuators and can determine, within certain limits, how much and how to perform the lubrication of the transmission 7). The control module 52 (in particular the calculation blocks 54 and 55 of the control module 52) uses a model of the pumps 23 and 24 to estimate (also somewhat in advance) the torque Pump_Needed_Torque needed by the pump (essential function of the target oil pressure System_Pressure_Tgt) and the target flow rate Flow_Tgt; subsequently, the control module 52 (in particular the coordination block 56 of the control module 52) uses a model of the auxiliary electric motor 27 for transforming the torque Pump_Needed_Torque needed by the pump and the target flow rate Flow_Tgt into the requested rotation speed Req_Speed and into the requested torque Req_Torque which allow the auxiliary electric motor 27 to assist the load in a sustainable manner (namely within the performance limits of the auxiliary electric motor 27).

In addition, the control module 52 (in particular the coordination block 56 of the control module 52) verifies if the auxiliary electric motor 27 is able to support the needs of the hydraulic system 22, and then if necessary makes a request to the hydraulic system 22 (by way of the torque reduction signal Torque_to_reduct and the resulting pressure reduction signal System_Pressure_to_reduct) to reduce its needs by delaying/slowing its performance.

Starting from the needs of the hydraulic actuation, the control module 52 (in particular the calculation block 53 of the control module 52) determines the target oil pressure System_Pressure_Tgt for the delivery side of the actuation pump 24. Furthermore, starting from the lubrication needs the control module 52 (in particular the calculation block 55 of the control module 52) determines the target flow rate Flow_Tgt. By means of a model of the pumps 23 and 24 (synthesized in a map or, alternatively, in a mathematical model), the control module 52 (in particular the calculation block 54 of the control module 52) starting from the target oil pressure System_Pressure_Tgt determines the torque Pump_Needed_Torque needed by the pump. Finally, the control module 52 (in particular the coordination block 56 of the control module 52) uses a model of the auxiliary electric motor 27 for turning the torque Pump_Needed_Torque needed by the pump and the target flow rate Flow_Tgt into the requested rotation speed Req_Speed and into the requested torque Req_Torque which allow the auxiliary electric motor 27 to assist the load in a sustainable manner (namely within the performance limits of the auxiliary electric motor 27). If the requests are beyond the possibilities (for example, due to non-modelled factors, limitations in the voltage supply or dispersion in the components), the loads are reduced thus reducing the request of the oil pressure System_Pressure so as to avoid counterproductive shutdowns of the auxiliary electric motor 27.

It is important to note that the hydraulic system 22 (in particular the part relating to the controlling of the hydraulic actuators) is devoid of a hydraulic accumulator to reduce the weight and especially the overall dimensions; accordingly, the auxiliary electric motor 27 must be able to control the actuation pump 24 to answer "just in time" to the requests for pressurized oil.

It is important to note that based on an alternative and completely equivalent embodiment, at least one of the maps mentioned above can be replaced by a corresponding mathematical model that has the same input/output coordinates of the maps; as the map, also the corresponding mathematical model is normally experimentally built by using a plurality of measurements performed by means of laboratory instruments.

The control method described above has numerous advantages.

First, the above described control method allows to control the auxiliary electric motor 27 very effectively in all situations, namely with the auxiliary electric motor 27 pursuing with extreme precision (namely with modest if not negligible control errors) the optimal targets both in a steady state, and in a dynamic state.

To better understand the high effectiveness of the control method described above, a comparison can be made between the graph of FIG. 6, illustrating the evolution in time of the targets (in dashed and dotted lines) and of the actual values (continuous line) of the pressure p(t) of the oil in the delivery side of the actuation pump 24 and the rotation speed ω(t) of the auxiliary electric motor 27 by applying a conventional control method, and the graph of FIG. 7, illustrating the evolution in time of the targets (in dashed and dotted lines) and of the actual values (continuous line) of the pressure p(t) of the oil in the delivery side of the actuation pump 24, of the torque t(t) applied to the carrier shaft 25 by the auxiliary electric motor 27, and the rotation speed ω(t) of the auxiliary electric motor 27 by applying the control method described above. By analyzing the graph of FIG. 6 (relative to a conventional control method), it is to note that the lubrication has been severely sacrificed in a situation in which the lubrication and hydraulic actuation targets are not in conflict (namely in a situation wherein any kind of lubrication sacrifice was not needed). Moreover, by analyzing the graph of FIG. 6 (relative to a conventional control method), it is to note that there is a risk of stalling the auxiliary electric motor 27 (namely to lose the synchronism of the auxiliary electric motor 27 with the consequent stopping of the auxiliary electric motor 27 itself); to prevent stalling of the auxiliary electric motor 27 it is normally necessary to reduce (at least temporarily) the hydraulic pressure (therefore the mechanical load that weighs on the auxiliary electric motor 27) by delaying and/or slowing the hydraulic actuations (thus degrading the performance of the transmission 7).

In addition, the control method described above is particularly strong, in that it always manages to avoid unwanted shutdown of the auxiliary electric motor 27 due to excessive sub-speed following a request to provide performance above the actual possibilities of the auxiliary electric motor 27 itself.

Finally, the control method described above is simple and inexpensive to implement, since it does not require the addition of any physical component (namely the hardware system is not modified in any way), but it is completely achievable via software. It is important to note that the control method described above does not required neither a high calculation capacity, nor an extended amount of memory and therefore its actuation is possible in a known control unit without the need for updates or upgrades.

The invention claimed is:

1. A method to control an electric motor of a hydraulic system of a transmission in a vehicle; the hydraulic system comprises a circulation pump allowing a lubricant oil to circulate, or an actuation pump providing the hydraulic pressure needed to operate the transmission, a carrier shaft on which the pumps are mounted, and the electric motor designed to cause the rotation of the carrier shaft; the control method comprises the steps of:

determining a requested torque (Req_Torque) to be applied by the electric motor to the carrier shaft;

determining a requested rotation speed (Req_Speed) to be imparted by the electric motor to the carrier shaft;

controlling the electric motor so as to pursue the requested torque (Req_Torque) and the requested rotation speed (Req_Speed);

determining a target oil pressure (System_Pressure_Tgt);

determining a torque (Pump_Needed_Torque) needed by the pump based on the target oil pressure (System_Pressure_Tgt);

determining the requested torque (Req_Torque) based on the torque (Pump_Needed_Torque) needed by the pump;

determining a target oil flow rate (Flow_Tgt) for an adequate lubrication;

determining the requested rotation speed (Req_Speed) based on the target oil flow rate (Flow_Tgt);

calculating a speed error by subtracting the actual rotation speed (Act_Speed) from a requested rotation speed (Req_Speed);

determining a sustenance torque (CL_Torque) based on the speed error by means of PID controller;

determining a friction torque (Friction_Torque) based on the actual rotation speed (Act_Speed) and on an inner temperature (Motor_Temp) of the electric motor; and calculating a target torque (Tgt_Torque) by adding the sustenance torque (CL_Torque), the friction torque (Friction_Torque) and the requested torque (Req_Torque) to be delivered by the electric motor to the carrier shaft.

2. The control method according to claim 1 and comprising the further steps of:

determining a maximum available torque (MAX_Available_Torque), which represents the maximum torque that can be delivered by the electric motor in the current conditions; and determining the requested torque (Req_Torque) also based on the maximum available torque (MAX_Available_Torque), which represents an upper limit that cannot be exceeded by the requested torque (Req_Torque).

3. The control method according to claim 2 and comprising the further step of determining a torque reduction signal (Torque_to_reduct), which indicates a potential mechanical overload of the electric motor, when the requested torque (Req_Torque), that would result based on the torque (Pump_Needed_Torque) needed by the pump, exceeds the maximum available torque (MAX_Available_Torque).

4. The control method according to claim 3 and comprising the further step of slowing down or deferring in time the hydraulic actuations in the transmission based on the torque reduction signal (Torque_to_reduct).

5. The control method according to claim 3 and comprising the further step of determining a pressure reduction signal (System_Pressure.sub.-- to_reduct) based on the torque reduction signal (Torque_to_reduct); wherein the pressure reduction signal (System_Pressure_to_reduct) is transmitted to a control unit controlling the hydraulics of the hydraulic system, so as to slow down and/or defer in time the hydraulic actuations.

6. The control method based on claim 1 and comprising the further steps of:

determining an actual model torque (Act_Torque_Model) by multiplying a target current (Tgt_Current) by a torque constant (KT); and determining the requested torque (Req_Torque) also based on actual model torque (Act_Torque_Model).

7. The control method according to claim 1, wherein the target oil pressure (System_Pressure_Tgt) is determined based on the needs for actuation through the hydraulic actuators, namely based on the operations to be carried out in the immediate future by the different hydraulic actuators.

8. The control method according to claim 1 and comprising the further steps of:

determining a rotation speed interval for the electric motor, within which the electric motor can deliver the requested torque (Req_Torque); and correcting, if necessary, the requested rotation speed (Req_Speed) determined based on the target oil flow rate (Flow_Tgt), so that the requested rotation speed (Req_Speed) is comprised in the rotation speed interval, within which the electric motor can deliver the requested torque (Req_Torque).

9. The control method according to claim 1 and comprising the further steps of:

determining an actual rotation speed (Act_Speed) of the electric motor; and determining the torque (Pump_Needed_Torque) needed by the pump also based on the actual rotation speed (Act_Speed) and on the requested rotation speed (Req_Speed).

10. The control method according to claim 1 and comprising the further step of favouring the needs concerning the fulfilment of the torque (Pump_Needed_Torque) needed by the pump rather than the needs concerning the fulfilment of the target flow rate (Flow_Tgt).

11. The control method according to claim 1 and comprising the further steps of:

calculating a target current (Tgt_Current) by dividing the target torque (Tgt_Torque) by a torque constant (KT);

determining an equivalent impedance (RLS) by means of a predetermined map (M);

calculating the voltage drop (V_I) by multiplying the target current (Tgt_Current) by the equivalent impedance (RLS);

calculating a counter-electromotive force (FCEM) by multiplying an actual rotation speed (Act_Speed) by a speed constant (KV); and determining a control voltage (V_Control) to be applied to the power supply terminals of the electric motor by adding the voltage drop (V_I) to the counter-electromotive force (FCEM).

12. The control method according to claim 1, wherein:

the electric motor is connected to the carrier shaft through the interposition of a first freewheel; and the hydraulic system comprises a second freewheel, which is designed to connect the carrier shaft to a drive shaft of an internal combustion heat engine.

* * * * *